United States Patent [19]
Kawada

[11] Patent Number: 5,390,056
[45] Date of Patent: Feb. 14, 1995

[54] RECORDING/REPRODUCING APPARATUS CAPABLE OF ACCEPTING TAPE CARTRIDGES OF DIFFERENT SIZES

[75] Inventor: Hideaki Kawada, Kanagawa, Japan

[73] Assignee: Sony Corporation, Tokyo, Japan

[21] Appl. No.: 61,733

[22] Filed: May 17, 1993

[30] Foreign Application Priority Data

May 19, 1992 [JP] Japan ................................. 4-150162

[51] Int. Cl.6 ............................................. G11B 5/008
[52] U.S. Cl. ........................................ 360/94; 360/132
[58] Field of Search ................. 360/132, 96.5, 96.6, 360/94; 242/197, 198, 199; 369/77.1, 77.2

[56] References Cited

U.S. PATENT DOCUMENTS

| | | | |
|---|---|---|---|
| 4,484,240 | 11/1984 | Yoshida | 360/96.5 |
| 4,697,702 | 10/1987 | Urayama | 360/132 |
| 4,782,407 | 11/1988 | Hwang | 360/93 |
| 5,032,939 | 7/1991 | Minara et al. | 360/96.5 |
| 5,198,951 | 3/1993 | Fujii | 360/132 |

Primary Examiner—Robert S. Tupper
Assistant Examiner—William R. Korzuch
Attorney, Agent, or Firm—William S. Frommer; Alvin Sinderbrand

[57] ABSTRACT

The present invention provides tape cartridges of different sizes, and a recording/reproducing apparatus provided with a compatible tape cartridge holding device capable of holding either of the large-sized tape cartridge and the small-sized tape cartridge, and provided with a lid opening lever capable of opening the respective lids of both the large-sized tape cartridge and the small-sized tape cartridge. The compatible tape cartridge holding device comprises a cartridge compartment plate (47) for holding a tape cartridge (1, 24) provided with a front lid (12, 34) and positioning the same at a cartridge loading position, a lid opening lever (58) pivotally supported on the cartridge compartment plate (47) for turning about an axis of turning aligned with the axis of turning of the front lid (12, 34) and provided with a lid opening pin (62) that engages with a recess (17, 39) formed in the front surface of the front lid (12, 34) when the tape cartridge (1, 24) is held in place on the cartridge compartment plate (47), and a lid opening pin (72) disposed on the path of movement of the lid opening lever (58) so as to engage the lid opening lever (58) as the cartridge compartment (47) is moved toward the cartridge loading position to open the front lid (12, 34) through the lid opening lever (58).

8 Claims, 20 Drawing Sheets

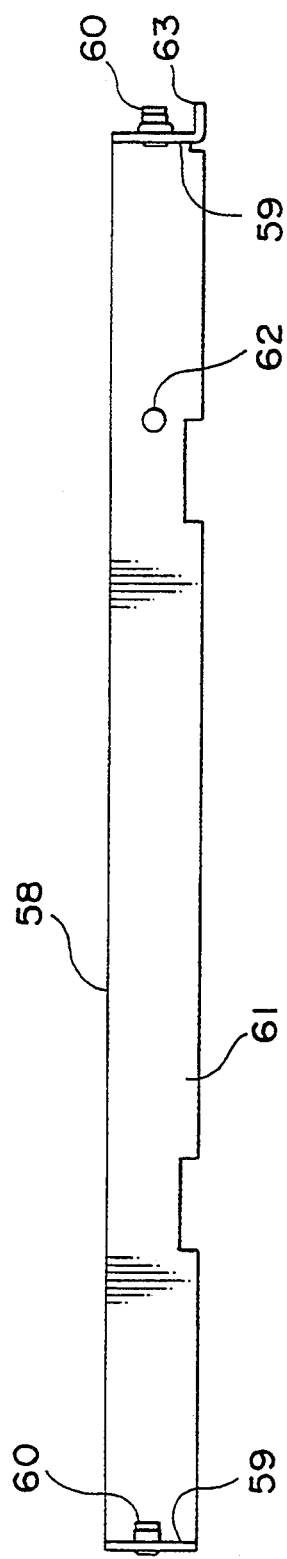
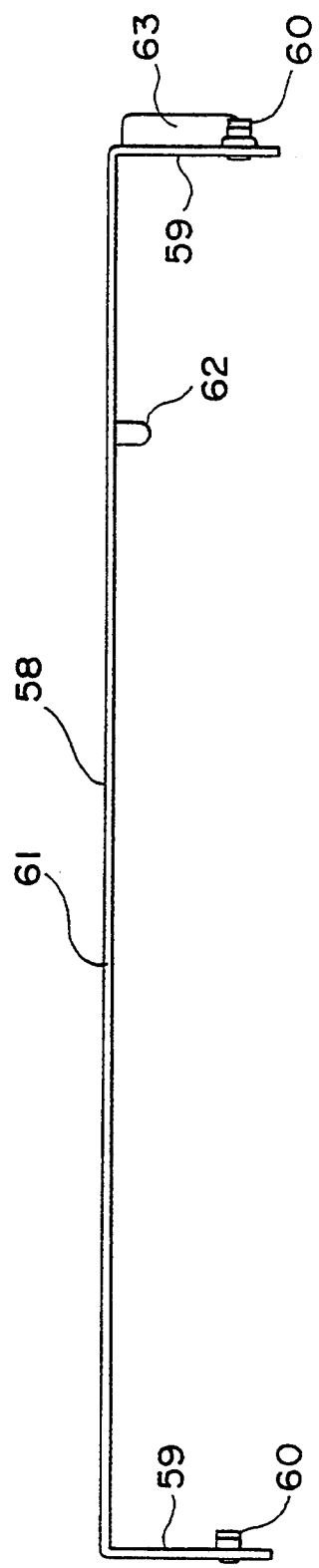

RECORDING/REPRODUCING APPARATUS CAPABLE OF ACCEPTING TAPE CARTRIDGES OF DIFFERENT SIZES

BACKGROUND OF THE INVENTION

1. Field of the Invention

The present invention relates to a novel tape cartridge and a recording/reproducing apparatus. More specifically, the present invention relates to a so-called compatible recording/reproducing apparatus capable of using tape cartridges of different sizes, and tape cartridges to be used by the compatible recording/reproducing apparatus.

2. Description of the Prior Art

There has been proposed a so-called compatible recording/reproducing apparatus capable of using tape cartridges of different sizes. However, this known compatible recording/reproducing apparatus has disadvantages that the lid operating mechanism thereof for opening the lid of a tape cartridge inserted therein is unsatisfactory, the lid operating member of the lid operating mechanism is disposed so close to the recording tape of the tape cartridge inserted therein that the recording tape of the tape cartridge inserted therein is liable to be damaged by the lid opening member, the tape cartridge needs to be provided internally with a guide in a high accuracy, and a large space formed therein to receive a large-sized tape cartridge provides a useless space for receiving a small-sized tape cartridge, making the miniaturization of the recording/reproducing apparatus, because one specified side of the small-sized tape cartridge must be positioned at the same position as that at which the specified side of the large-sized tape cartridge is positioned.

FIG. 26 shows a large-sized tape cartridge a and a small-sized tape cartridge h hypothetically superposed in the known compatible recording/reproducing apparatus.

The large-sized tape cartridge a has a case b provided with tape outlets c formed at the opposite ends, respectively, of the front side thereof, and a mouth d formed in the front portion of the case b between the tape outlets c and opening forward and downward. When the large-sized tape cartridge a is inserted in the compatible recording/reproducing apparatus, the tape loading members of the recording/reproducing apparatus are received in the mouth d. A pair of tape reels e are supported for rotation within the case b, and a magnetic tape f of a predetermined length having opposite ends attached to the pair of tape reels e is held on the pair of tape reels e. A portion of the magnetic tape f extends outside the case b between the tape outlets c.

The small-sized tape cartridge h has a case i provided with tape outlets j formed at the opposite ends, respectively, of the front side thereof, and a mouth k formed in the front portion of the case i between the tape outlets j and opening forward and downward. When the small-sized tape cartridge h is inserted in the compatible recording/reproducing apparatus, the tape loading members of the compatible recording/reproducing apparatus are received in the mouth k. A pair of tape reels 1 are supported for rotation within the case i, and a magnetic tape m of a predetermined length having opposite ends attached to the pair of tape reels 1 is held on the pair of tape reels 1. A portion of the magnetic tape m extends outside the case i between the tape outlets j.

The respective sizes of the mouths d and k of the tape cartridges a and h are the same and the respective positions of the mouths d and k in the recording/reproducing apparatus coincide with each other when the tape cartridges a and h are inserted in the recording/reproducing apparatus as shown in FIG. 26.

Indicated at o in FIG. 26 are guiding areas in the large-sized tape cartridge a, namely, areas in which the magnetic tape f will not touch any part of the case b while the magnetic tape f is unwound from the start of feeding the magnetic tape f from the fully loaded reel g to the end of feeding the magnetic tape f from the same reel g. The tape guides of the compatible recording/reproducing apparatus may be disposed within these guiding areas o. Indicated at p are guiding areas in the small-sized tape cartridge h.

Areas in the compatible recording/reproducing apparatus corresponding to portions of the guiding areas o and p overlapping each other are common guiding areas for both the large-sized tape cartridge a and the small-sized tape cartridge h. Indicated at q are tape path areas in the large-sized tape cartridge a and at r are tape path areas in the small-sized tape cartridge h. The lids s and t of the tape cartridges a and h must not be located in the tape path areas q and r when opened. A recording/reproducing apparatus designed specially for the tape cartridge a or h may be provided with a lid opening member u or v. However, the lid opening lever v of the small-sized tape cartridge h interferes with the tape path area q of the large-sized tape cartridge a in the compatible recording/reproducing apparatus. Therefore, the compatible recording/reproducing apparatus cannot be provided with the lid opening member v.

Thus, it is difficult to provide the compatible recording/reproducing apparatus with a single lid opening lever capable of opening the respective lids of both the large-sized tape cartridge a and the small-sized tape cartridge h.

SUMMARY OF THE INVENTION

Accordingly, it is an object of the present invention to provide a compatible recording/reproducing apparatus provided with a single lid opening member capable of opening the respective lids of both a large-sized tape cartridge and a small-sized tape cartridge, not requiring internal guides, which must be formed in a high accuracy, of the tape cartridges, and to provide a tape cartridge capable of being miniaturized to a small size.

A tape cartridge in accordance with the present invention is having lid provided with a socket with which the lid opening member of the recording/reproducing apparatus engages.

A recording/reproducing apparatus in accordance with the present invention is provided with a lid opening member for holding a tape cartridge and moving the same to a predetermined position in a cartridge compartment, having an operating portion that engages with a socket formed in the front surface of the lid of the tape cartridge, and pivotally supported in the cartridge compartment by a shaft coaxially with the axis of turning of the lid of the tape cartridge when the tape cartridge is held in place in the cartridge compartment, and a pushing member disposed within the cartridge compartment on the path of the tape cartridge to push the lid opening member so that the lid opening lever will open the lid of the tape cartridge.

The socket of the lid of a large-sized tape cartridge and that of the lid of a small-sized tape cartridge are located at a predetermined position when the large-sized tape cartridge and the small-sized tape cartridge are inserted in the recording/reproducing apparatus even if the recording/reproducing apparatus is of a compatible type, so that the single lid opening member of the recording/reproducing apparatus is able to operate the lids of both the large-sized tape cartridge and the small-sized tape cartridge.

BRIEF DESCRIPTION OF THE DRAWINGS

The above and other objects, features and advantages of the present invention will become more apparent from the following description taken in connection with the accompanying drawings, in which:

FIG. 24 is a back view of a lid opening lever;

FIG. 25 is a plan view of the lid opening lever of FIG. 24; and

DETAILED DESCRIPTION OF THE PREFERRED EMBODIMENTS

Figure 1:
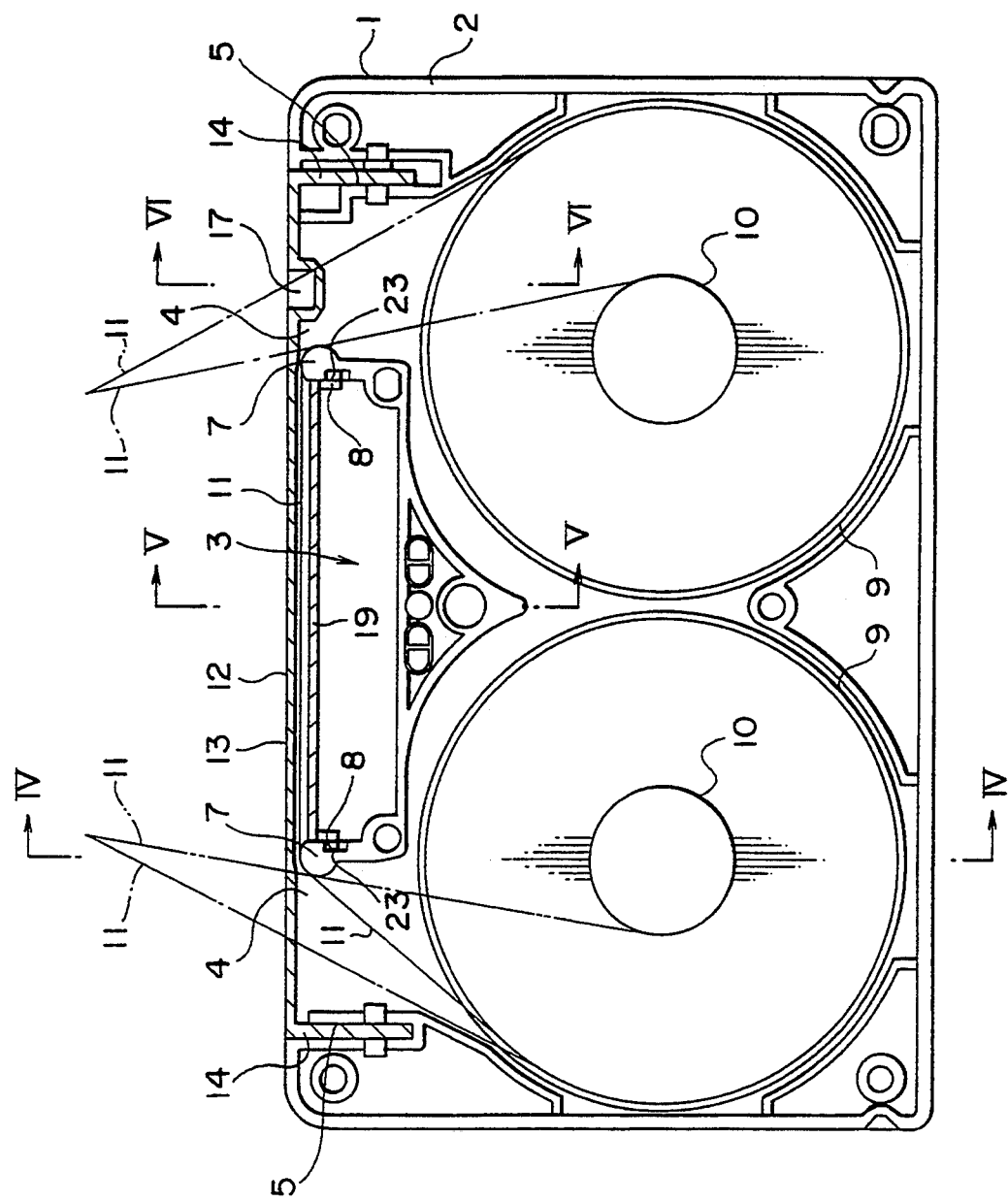
FIG. 1 is a horizontal sectional view of a large-sized tape cartridge in a preferred embodiment according to the present invention.

Large-sized Tape Cassette (FIGS. 1 to 7)

A large-sized tape cartridge 1 has a case 2 having the shape of a flat, laterally elongate, rectangular box and provided with a mouth 3 opening forward and downward in the middle portion of the front side thereof. The length, i.e., the lateral size, of the mouth 3 is about half the lateral length of the case 2. Tape outlets 4 are formed in the front side of the case 2 at the opposite ends of the mouth 3, respectively. Narrow grooves 5 opening forward and extending across the thickness of the case 2 are formed in the front side of the case at positions near the opposite ends of the front side of the case 2. A long relief groove 6 is formed in the middle portion of the bottom wall of the case 2 so as to extend along the width of the case 2 and to open into the mouth 3. Internal tape guides 7 are formed at the opposite ends of the mouth 3 near the tape outlets 4, respectively. When the tape cartridge 1 is not in use, the magnetic tape 11 is extended between the internal tape guides 7. Guide grooves 8 are formed in opposite side surfaces defining the opposite ends of the mouth 3 substantially along the thickness of the tape cartridge 1.

Tape reels 9 are disposed in a lateral arrangement and supported for rotation within the case 2. The free ends of the magnetic tape 11 having a specified length and held on the reels 9 are attached to the hubs 10 of the tape reels 9. When the tape cartridge 1 is not in use, a portion of the magnetic tape 11 pulled outside the case 2 extends along the front side of the mouth 3 between the internal tape guides 7. The hubs 10 are provided with splined hales 10a, which are accessible from outside through through holes 2a formed in the bottom wall of the case 2.

When the tape cartridge 1 is not in use, the portion of the magnetic tape 11 extending along the front side of the case 2 is covered with a protective front lid 12. The front lid 12 has a front wall 13 for covering the front side of the magnetic tape 11, side walls 14 extending backward from the opposite ends of the front wall 13, and an upper wall 15 extending obliquely upward from the upper edges of the front wall 13 and the side walls 14, which are formed in an integral member.

Figure 5:
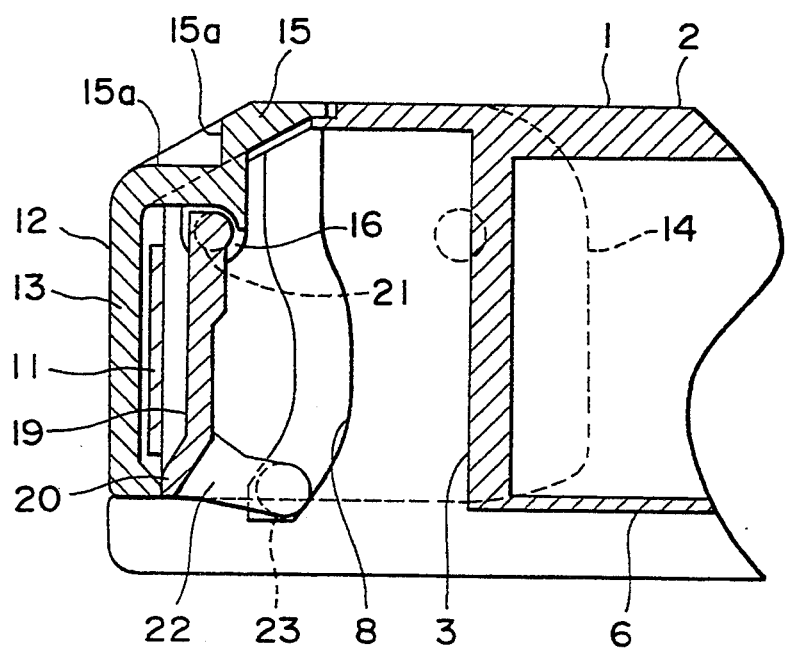
FIG. 5 is an enlarged sectional view taken on line V—V in FIG. 1.
Figure 6:
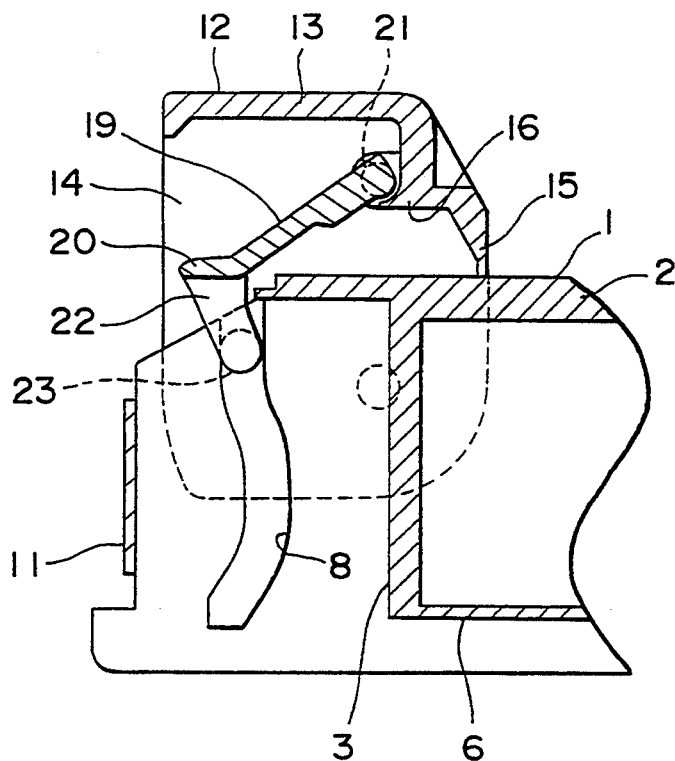
FIG. 6 is an enlarged sectional view, similar to FIG. 5, in which the lid is open.
Figure 7:
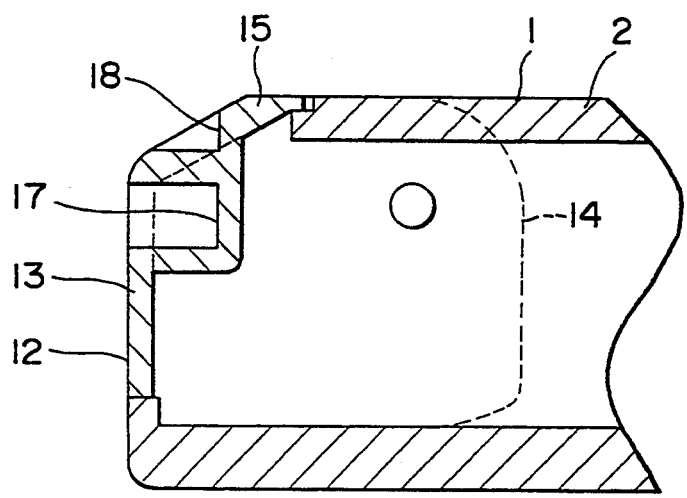
FIG. 7 is an enlarged sectional view taken on line VII—VII in FIG. 1.
Figure 8:
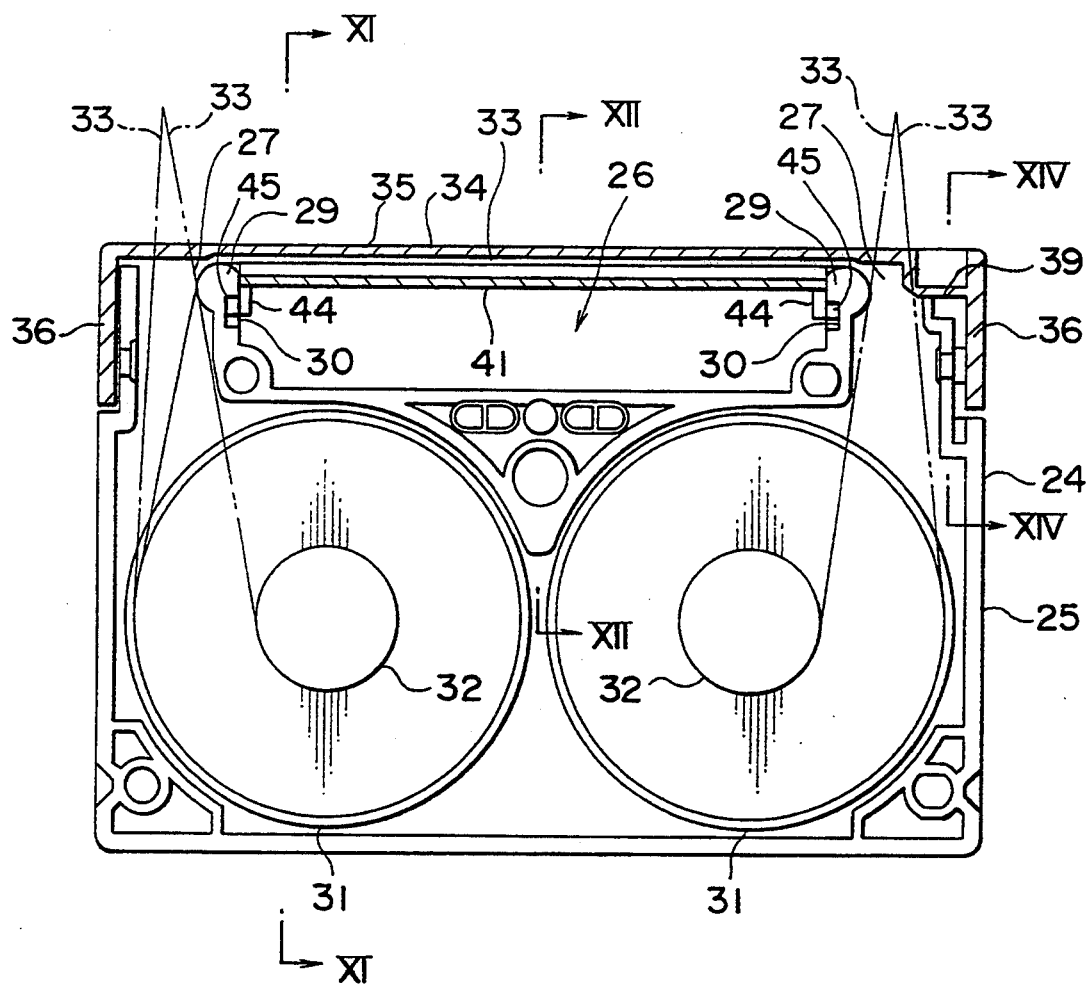
FIG. 8 is a horizontal sectional view of a small-sized tape cartridge in a preferred embodiment according to the present invention.

The side walls 14 of the front lid 12 are inserted in the narrow grooves 5 and supported so that the front lid 12 is able to turn vertically between a closed position for covering the front side of the magnetic tape 11 extending along the front side of the case 2 as shown in FIG. 5 and an open position for exposing the front side of the magnetic tape 11 as shown in FIG. 6. The front lid is biased toward the closed position by an elastic means, not shown. Small knuckles 16 are formed on the lower surface of the upper wall 15 of the front lid 12 at positions corresponding to the opposite ends of the mouth 3, respectively.

Figure 2:
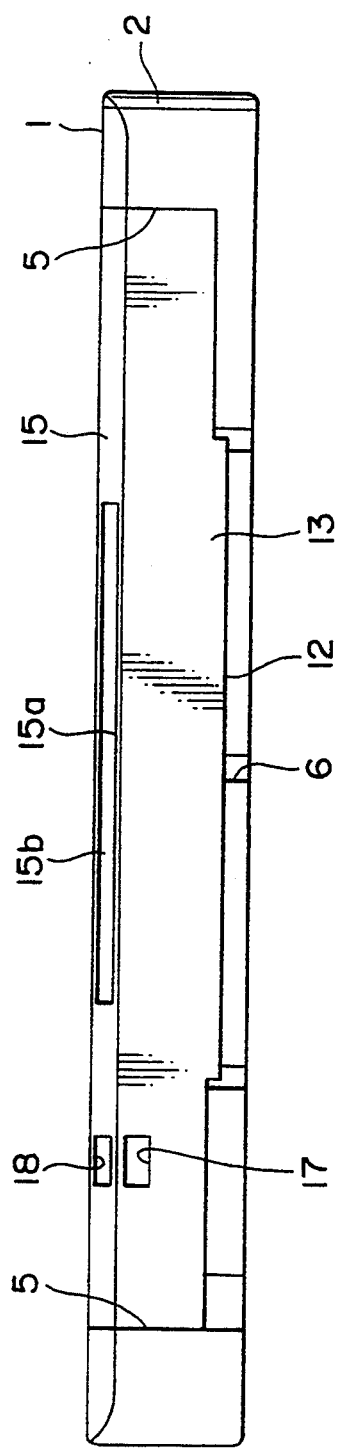
FIG. 2 is a front view of the large-sized tape cartridge of FIG. 1.
Figure 3:
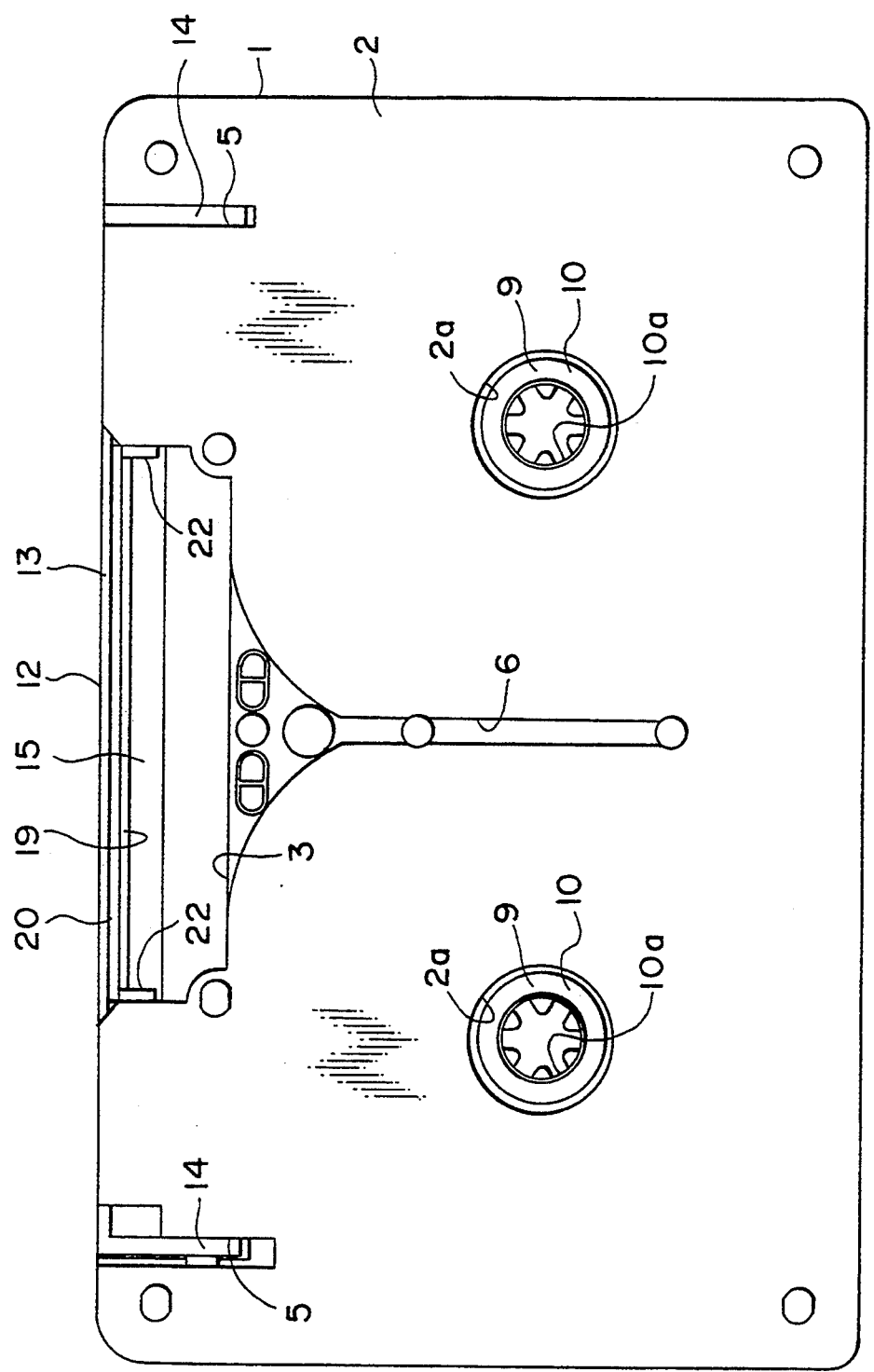
FIG. 3 is a bottom view of the large-sized tape cartridge of FIG. 1.
Figure 4:
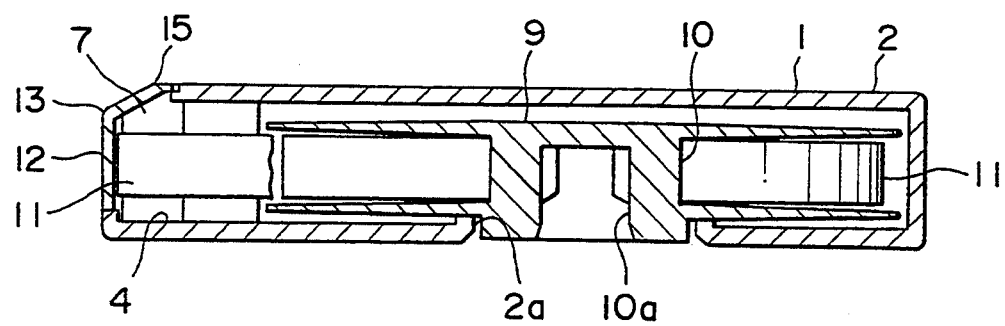
FIG. 4 is a sectional view taken on line IV—IV in FIG. 1.

As shown in FIG. 2, a socket 17 is formed in the front surface of the front wall 13 of the front lid 12 at a position at a small distance from one end toward the center of the front wall 13, and a relief socket 18 is formed in the lower surface of the upper wall 15 at a position above the socket 17. As shown in FIGS. 2 and 5, a laterally elongate recess 15a having a vertical surface 15b is formed in the middle portion of the front surface of the upper wall 15.

A back lid 19 covers the backside of the magnetic tape 11 extending along the front side of the case 2 within the mouth 3 when the tape cartridge 1 is not in use. The back lid 19 is a plate having a height slightly smaller than that of the front wall 13 of the front lid 12, and a length slightly shorter than that of the mouth 3. The lower portion 20 of the back lid 19 is bent forward at a small angle. Pins 21 projecting from the upper portions of the opposite ends of the back lid 19 are fitted in the knuckles 16 of the front lid 12, respectively, so that the back lid 19 is able to swing relative to the front lid 12. Arms 22 are extended backward from the opposite ends of the lower portion 20 of the back lid 19, and cam followers 23 are formed on the extremities of the arms 22. The cam followers 23 are fitted slidably in the guide grooves 8 formed in the walls of the case 2 defining the opposite ends of the mouth 3.

The position and posture of the back lid 19 are uniquely dependent on the respective positions of the knuckles 16 of the front lid 12 and the guide grooves 8 along which the cam followers 23 move. The position and posture of the back lid 19 vary according to the movement of the front lid 12. When the front lid 12 is at the closed position, most part of the back lid 19 covers the backside of the magnetic tape 11 and the lower edge of the lower portion 20 of the back lid 19 is in contact with the lower end of the backside of the front wall 13 of the front lid 12 as shown in FIG. 5. When the front lid 12 is at the open position, most part of the back lid 19 extends above the upper wall of the case 2 as shown in FIG. 6. While the front lid 12 is moving between the open position and the closed position, the posture of the back lid 19 is controlled so that the back lid 19 will not touch the magnetic tape 11.

Small-sized Tape Cassette (FIGS. 7 to 14)

The small-sized tape cartridge 24 has a case 25 having the shape of a flat, laterally elongate, rectangular box having a width about 0.7 times that of the large-sized tape cartridge 1 and a length about 0.6 times that of the large-sized tape cartridge 1, and provided with a mouth 26 opening forward and downward in the middle portion of the front side thereof. The size of the mouth 26 is approximately equal to that of the mouth 3 of the large-sized tape cartridge 1. Tape outlets 27 are formed in the front side of the case 25 at the opposite ends of the mouth 26, respectively. A long positioning groove 28 is formed in the middle portion of the bottom wall of the case 25 so as to extend along the width of the case 2 and to open into the mouth 26. The front portion of the positioning groove 28 is expanded toward the front end to form a leading section. Internal tape guides 29 are formed at the opposite ends of the mouth 26 near the tape outlets 27, respectively. When the tape cartridge 24 is not in use, the magnetic tape 33 is extended between the internal tape guides 29. Guide grooves 30 are formed in opposite side surfaces defining the opposite ends of the mouth 26 substantially along the thickness of the tape cartridge 24.

Tape reels 31 are disposed in a lateral arrangement and supported for rotation within the case 25. The free ends of the magnetic tape 33 having a specified length and held on the reels 31 are attached to the hubs 32 of the tape reels 31. When the tape cartridge 24 is not in use, a portion of the magnetic tape 33 pulled outside the case 25 extends along the front side of the mouth 26 between the internal tape guides 29. The hubs 32 are provided with splined holes 32a, which are accessible from outside through through holes 25a formed in the bottom wall of the case 25.

When the tape cartridge 24 is not in use, the portion of the magnetic tape 33 extending along the front side of the case 25 is covered with a protective front lid 34. The front lid 34 has a front wall 35 for covering the front side of the magnetic tape 33, side walls 36 extending backward from the opposite ends of the front wall 35, and an upper wall 37 extending obliquely upward from the upper edges of the front wall 35 and the side walls 36, which are formed in an integral member.

Figure 12:
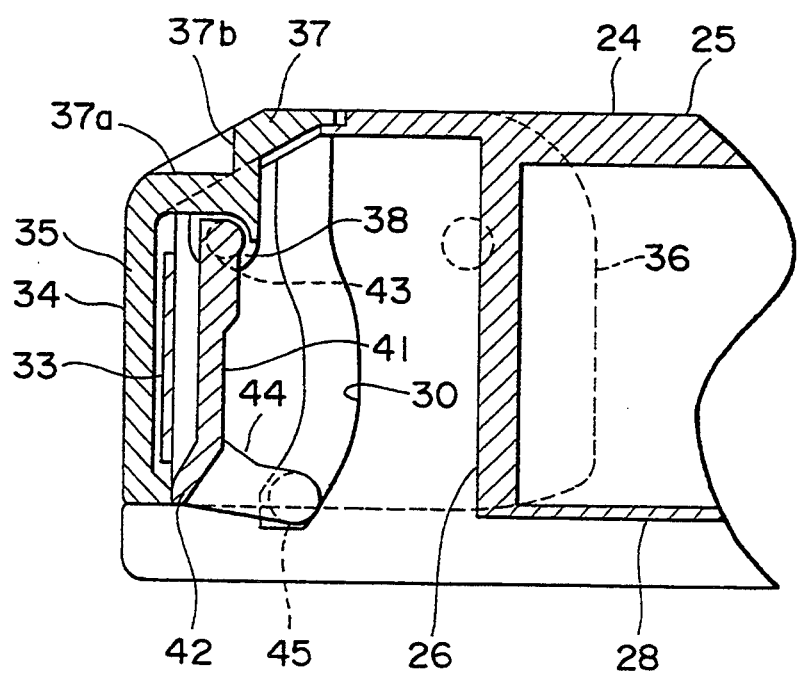
FIG. 12 is an enlarged sectional view taken on line XII—XII in FIG. 8.
Figure 13:
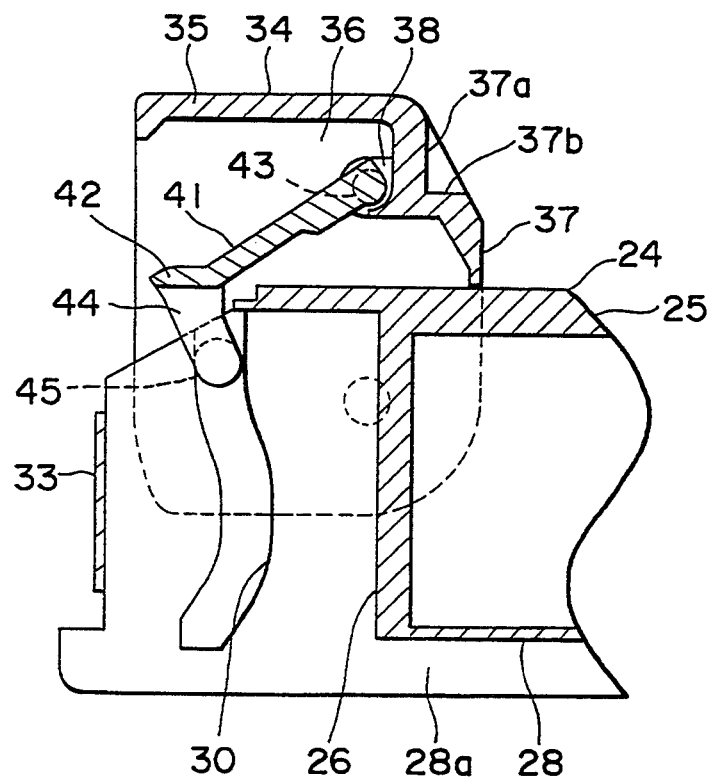
FIG. 13 is an enlarged sectional view, similar to FIG. 12, in which the lid is open.
Figure 14:
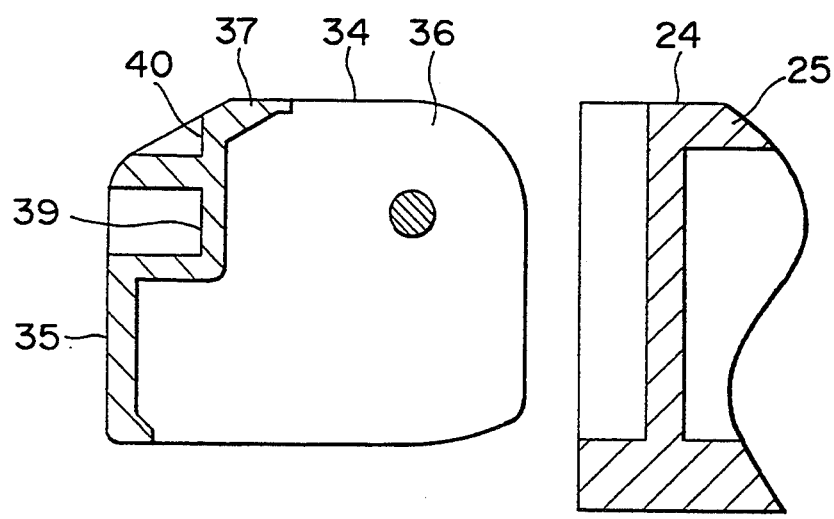
FIG. 14 is an enlarged sectional view taken on line XIV—XIV in FIG. 8.

The side walls 36 of the front lid 34 are supported pivotally on the front portions of the opposite side walls of the case 25 so that the front lid 34 is able to turn vertically between a closed position for covering the front side of the magnetic tape 33 extending along the front side of the case 25 as shown in FIG. 12 and an open position for exposing the front side of the magnetic tape 33 as shown in FIG. 13. The front lid 33 is biased toward the closed position by an elastic member, not shown. Small knuckles 38 are formed on the lower surface of the upper wall 37 of the front lid 34 at positions corresponding to the opposite ends of the mouth 26, respectively.

Figure 9:
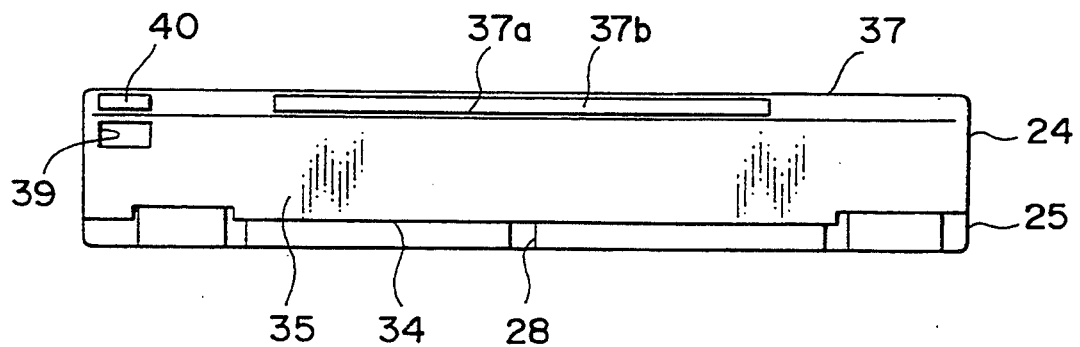
FIG. 9 is a front view of the small-sized tape cartridge of FIG. 8.
Figure 10:
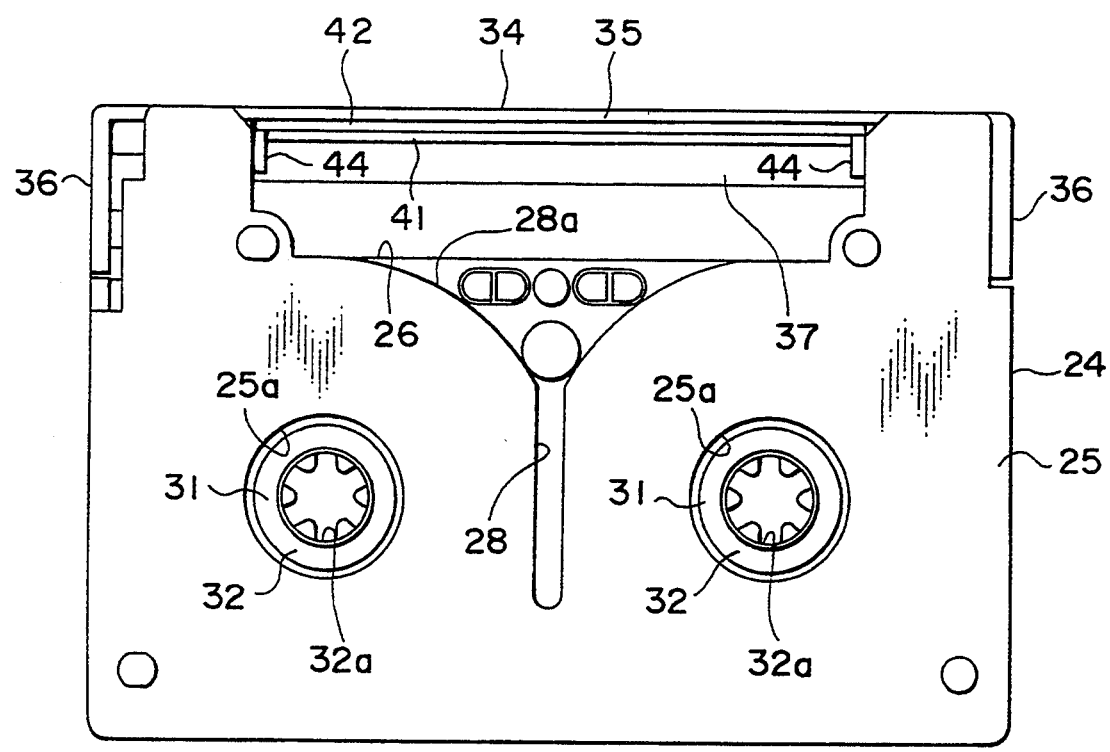
FIG. 10 is a bottom view of the small-sized tape cartridge of FIG. 8.
Figure 11:
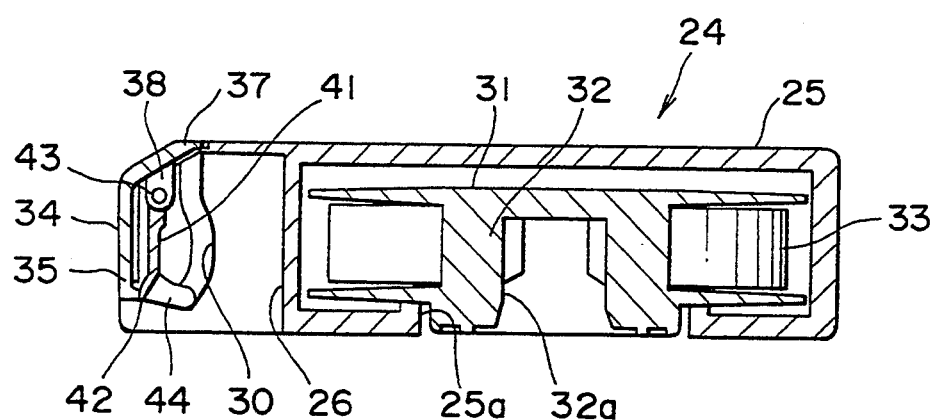
FIG. 11 is a sectional view taken on line XI—XI in FIG. 8.

As shown in FIG. 9, a socket 39 is formed in the front surface of the front wall 35 of the front lid 34 at a position near one end of the front wall 35, and a relief socket 40 is formed in the upper wall 37 at a position above the socket 39. As shown in FIG. 12, a laterally elongate recess 37a having a vertical surface 37b is formed in the front surface of the upper wall 37 excluding small portions in the opposite ends of the upper wall 37.

A back lid 41 covers the backside of the magnetic tape 33 extending along the front side of the case 25 in the mouth 26. The back lid 41 is a plate having a height slightly smaller than that of the front wall 35 of the front lid 34, and a length slightly shorter than that of the mouth 26. The lower portion 42 of the back lid 41 is bent forward at a small angle. Pins 43 projecting from the upper portions of the opposite ends of the back lid 41 are fitted in the knuckles 38 of the front lid 34, respectively, so that the back lid 41 is able to swing relative to the front lid 41. Arms 44 are extended backward from the opposite ends of the lower portion 42 of the back lid 41, and cam followers 45 are formed on the extremities of the arms 44. The cam followers 45 are fitted slidably in the guide grooves 30 formed in the walls of the case 25 defining the opposite ends of the mouth 26.

The position and posture of the back lid 41 are uniquely dependent on the respective positions of the knuckles 38 of the front lid 34 and the guide grooves 30 along which the cam followers 45 move. The position and posture of the back lid 41 vary according to the movement of the front lid 34. When the front lid 34 is at the closed position, most part of the back lid 41 covers the backside of the magnetic tape 33 and the lower edge of the lower portion 42 of the back lid 41 is in contact with the lower end of the backside of the front wall 35 of the front lid 34 as shown in FIG. 12. When the front lid 34 is at the open position, most part of the back lid 41 extends above the upper wall of the case 25 as shown in FIG. 13. While the front lid 34 is moving between the open position and the closed position, the posture of the back lid 41 is controlled so that the back lid 41 will not touch the magnetic tape 33.

Recording/reproducing Apparatus (FIGS. 15 to 25)

A recording/reproducing apparatus in a preferred embodiment is a compatible video tape recorder (hereinafter abbreviated to "VTR") 46.

The VTR 46 is provided with a cartridge compartment plate 47 for holding the large-sized tape cartridge 1 or the small-sized tape cartridge 24 and transferring the tape cartridge 1 (24) to a cartridge loading position. The cartridge compartment plate 47 has a bottom wall 48, side walls 49 formed integrally with the bottom wall 48 so as to extend from the opposite side edges, respectively, of the bottom wall 48, and an upper supporting plate 50 extended between the upper edges of the side walls 49. The front portion of each side wall 49 extends both upward and downward from the bottom wall 48, and the rear portion of each side wall 49 extends only upward from the bottom wall 48. A large recess 51 opening upward is formed between the upper extension of the front portion of each side wall 49 and the rear portion of the same side wall 49. Supporting arms 52 project from the upper portions of the front edges of the rear portions of the side walls 49 into the recesses 51, respectively. A torsion spring 53 is held on the supporting plate 50, and pressing places 54 are held down on the supporting plate 50 by the torsion spring 53. A positioning rib 55 is extended in the direction of movement of the compartment plate 47 on the upper surface of the bottom wall 48 in the central portion of the bottom wall 48. One pin 56 projects from the rear end of the rear portion of each side wall 49, one pin 56 projects from the upper end of the front portion of each side wall 49, and one pin 56 projects from the lower end of the front portion of each side wall 49. Rollers 57 are supported on the pins 56, respectively.

A lid opening member 58 is formed by bending a plate in a shape resembling a laterally expanded letter U, and has a laterally elongate main section 61 and side sections 59 extending from the opposite ends of the main section 61. The side sections 59 are supported pivotally at the extremities thereof on the support arms 52 of the cartridge compartment plate 47 by supporting pins 60, respectively. A lid opening pin 62 projects backward from a predetermined position on the back surface of the main section 61 of the lid opening member 58, and a lug 63 projects outward from the lower edge of one of the side sections 59. A torsion coil spring 64 has a coil portion put on one of the supporting pins 60, one arm resiliently in contact with the upper edge of the supporting arm 52 and the other arm resiliently in contact with the upper edge of the side section 59. Thus, the lid opening member 58 is biased counterclockwise, as viewed in FIGS. 15, 17 and 18, by the torsion coil spring 64. When any pressure is applied to the lug 63, the side sections 59 of the lid opening member 58 is substantially in a horizontal standby position.

Racks 65 each formed in a shape substantially resembling the letter L laid sideways with its shorter stroke extending upward so as to extend along the lower edge of the slide edge of the bottom wall 48 and the rear edge of the side wall 49 are attached to the cartridge compartment plate 47.

A pair of parallel side walls 66 of a cartridge holding unit are spaced apart from each other and extended along the direction of movement of the cartridge compartment plate 47. Each side wall 66 is provided with three guide slots 67 having a shape resembling the letter L laid sideways with its shorter stroke extending downward and its longer stroke extending in a direction opposite the direction in which the horizontal section of the rack 65 extends from the junction of the horizontal section and the vertical section of the rack 65. The rollers 56 of the cartridge compartment plate 47 roll along the guide slots 67 of the side walls 66, respectively, so that the cartridge compartment plate 47 is supported on the side walls 66 for movement along a path substantially resembling the letter L laid sideways.

Driving gears 68, namely, spur gears, are supported for rotation on the side walls 66 at positions near the bends of the rear guide slots 67 so as to be in engagement with the racks 65, respectively. Intermediate gears 69, namely, spur gears, are supported for rotation on the side walls 66 so as to be in engagement with the driving gears 68, respectively. A shaft 70 is extended between and journaled on the side walls 66, and phasing gears 71, namely, spur gears, are fixedly mounted on the opposite ends of the shaft 70 so as to be in engagement with the intermediate gears 69, respectively, to maintain the driving gears 68 in phase. One of the phasing gears 71 is connected to a driving motor, not shown, by a gear train. The driving motor drives the driving gears 68 engaged with the racks 65 of the cartridge compartment plate 47 through the phasing gears 71 and the intermediate gears 69 to move the cartridge compartment plate 47.

A pushing member 72 projects from one of the side walls 66 into the path of the lug 63 of the lid opening member 58 supported on the cartridge compartment plate 47. More specifically, the pushing member 72 projects into a vertical path along which the lug 63 moves when the rollers 57 of the cartridge compartment plate 47 moves the vertical sections of the guide slots 67.

When the large-sized tape cartridge 1 is inserted in the cartridge compartment plate 47, the side walls 49 of the cartridge compartment plate 47 are contiguous with the side walls of the case 2 to position the large-tape cartridge 1 with respect to lateral directions. When the small-sized tape cartridge 24 is inserted in the cartridge compartment plate 47, the positioning rib 55 formed on the bottom wall 48 of the cartridge compartment plate 47 engages with the positioning groove 28 formed on the bottom wall of the case 25 to position the small-sized tape cartridge 24 with respect to lateral directions. When the large-sized tape cartridge 1 is inserted in the cartridge compartment plate 47, the positioning rib 55 of the cartridge compartment plate 47 protrudes into the relief groove 6 of the case 2, so that the positioning rib 55 will not interfere with the large-sized tape cartridge 1.

Upon the arrival of the tape cartridge 1 (24) at the limit of insertion in the cartridge compartment plate 47, the lid opening pin 62 of the lid opening member 58 comes into the socket 17 (39) of the front lid 12 (34) and, at the same time, an unlocking member, not shown, unlocks the front lid 12 (34). In this state, the axes of the pins 60 pivotally supporting the lid opening lever 58 are aligned with the axis of turning of the front lid 12 (34) of the tape cartridge 1 (24).

If the tape cartridge 1 (24) is inserted upside down into the cartridge compartment plate 47, the vertical surface 15b (37b) of the laterally elongate recess 15a (37a) of the front lid 12 (34) strikes against the positioning rib 55 of the cartridge compartment plate 47 and, consequently, the tape cartridge 1 (24) is unable to advance further into the cartridge compartment plate 47. Thus, the insertion of the tape cartridge 1 (24) into the cartridge compartment plate 47 in an upside-down position can be prevented.

Upon the insertion of the tape cartridge 1 (24) into the cartridge compartment plate 47 to the limit of insertion, a sensor, not shown, detects the tape cartridge 1 (24). Then, the driving motor, not shown, is actuated to drive the driving gears 68 for synchronous rotation in a counterclockwise direction, as viewed in FIGS. 15, 17 and 18, to advance the cartridge compartment plate 47 together with the racks 65. Then, the cartridge compartment plate 47 advances horizontally toward the depth of the cartridge holding unit in the initial stage of forward movement, moves slightly upward, and then moves downward to the cartridge loading position.

As the cartridge compartment plate 47 moves downward, the lug 63 of the lid opening member 58 comes into contact with the pushing member 72 and, as the cartridge compartment plate 47 descends further, the pushing member 72 pushes up the lug 63 of the lid opening member 58 relative to the cartridge compartment plate 47. Consequently, the lid opening member 58 is turned upward, namely, in a clockwise direction, as viewed in FIGS. 15, 7 and 18, to a lid opening completion position, where the side arms 59 of the lid opening member 58 extend in a substantially vertical position. While the lid opening member 58 is thus turned, the lid opening pin 62 engaging with the socket 17 (39) turns the front lid 12 (34) to the open position.

Figure 15:
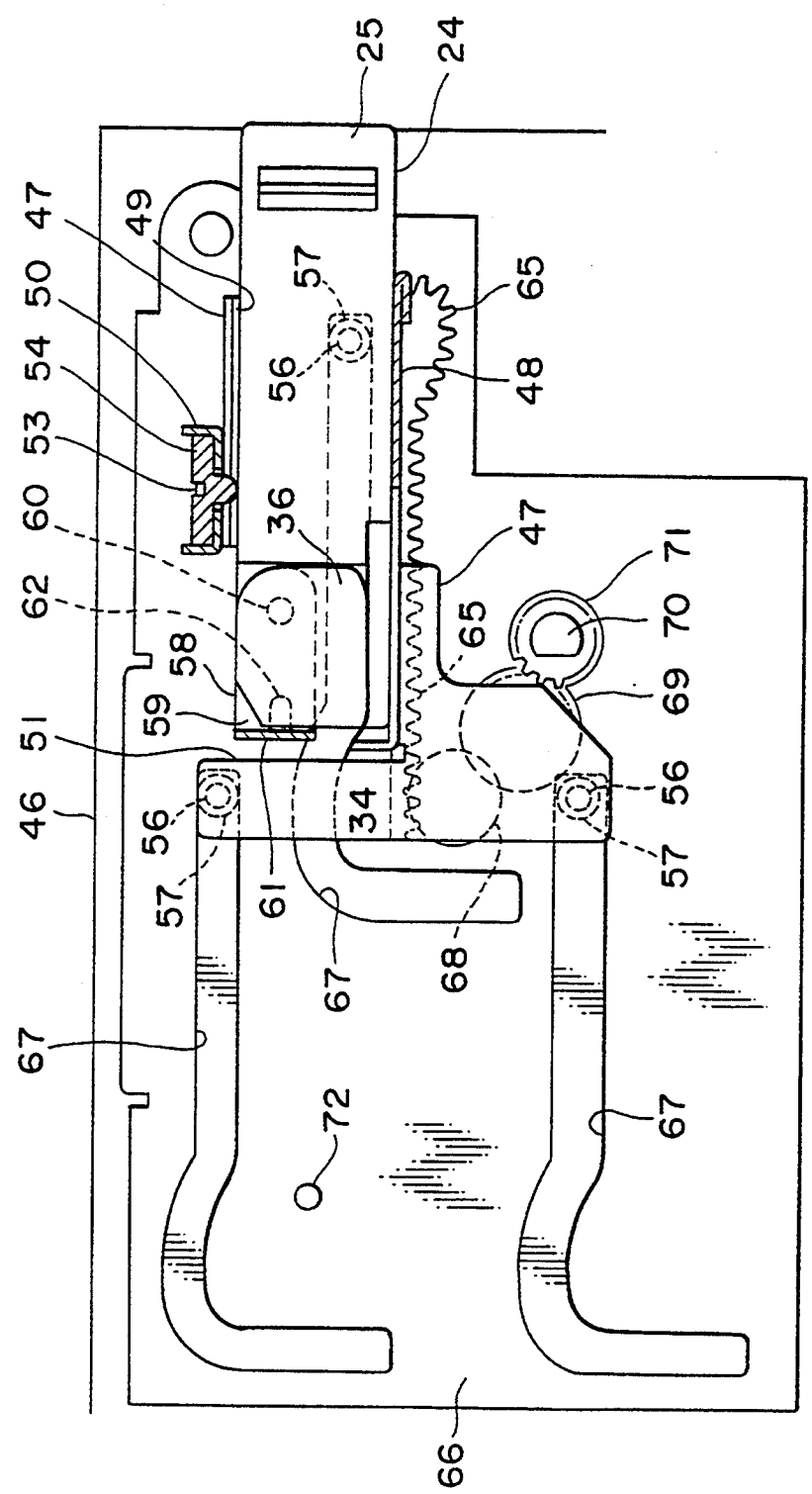
FIG. 15 is a side view of an essential portion of a recording/reproducing apparatus in a preferred embodiment according to the present invention, in which the small-sized tape cartridge is inserted in the recording/reproducing apparatus.
Figure 16:
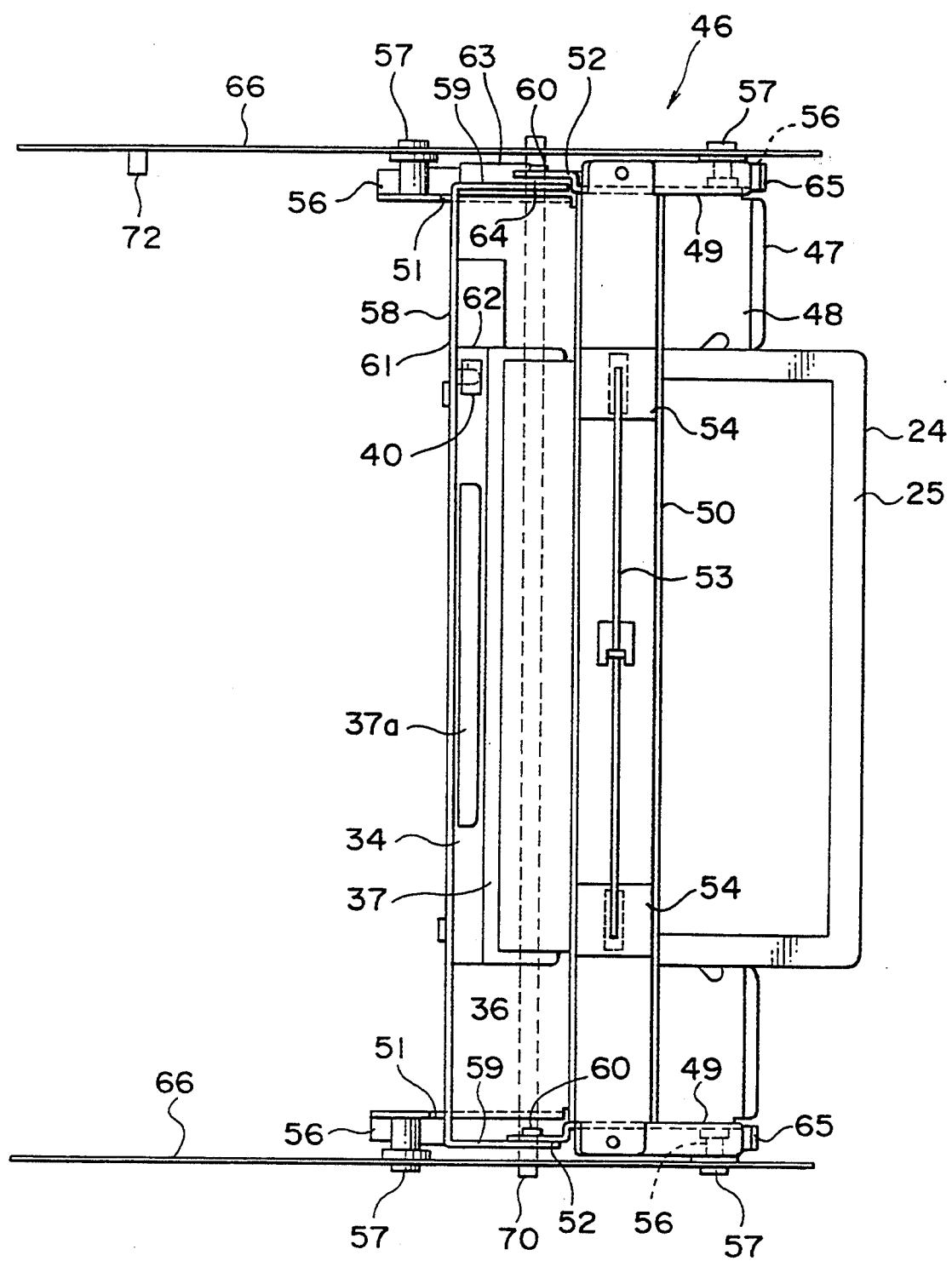
FIG. 16 is a plan view of the essential portion of the recording/reproducing apparatus of FIG. 15.
Figure 17:
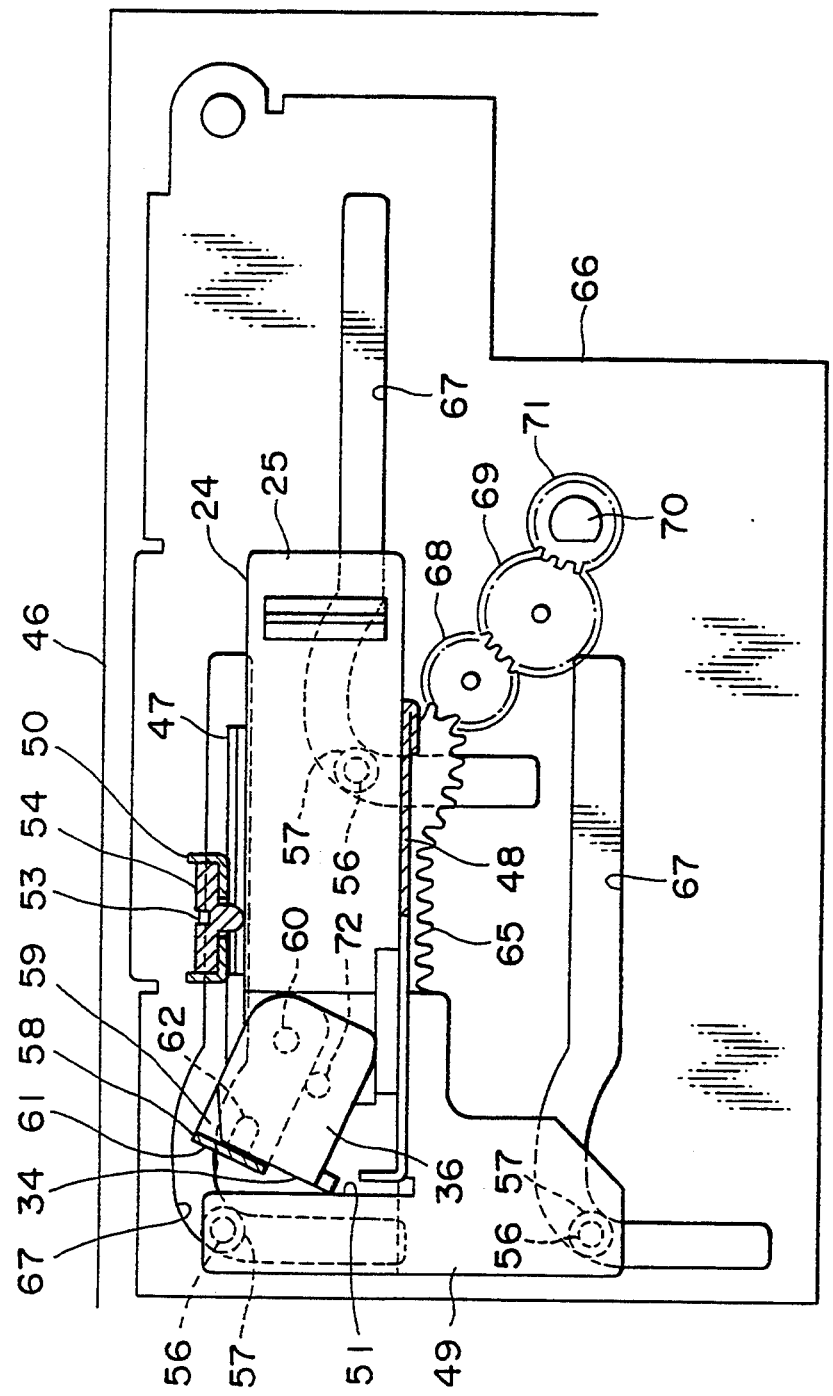
FIG. 17 is a side view of a cartridge compartment plate in a state in which the cartridge compartment plate is moving to a cartridge loading position.
Figure 18:
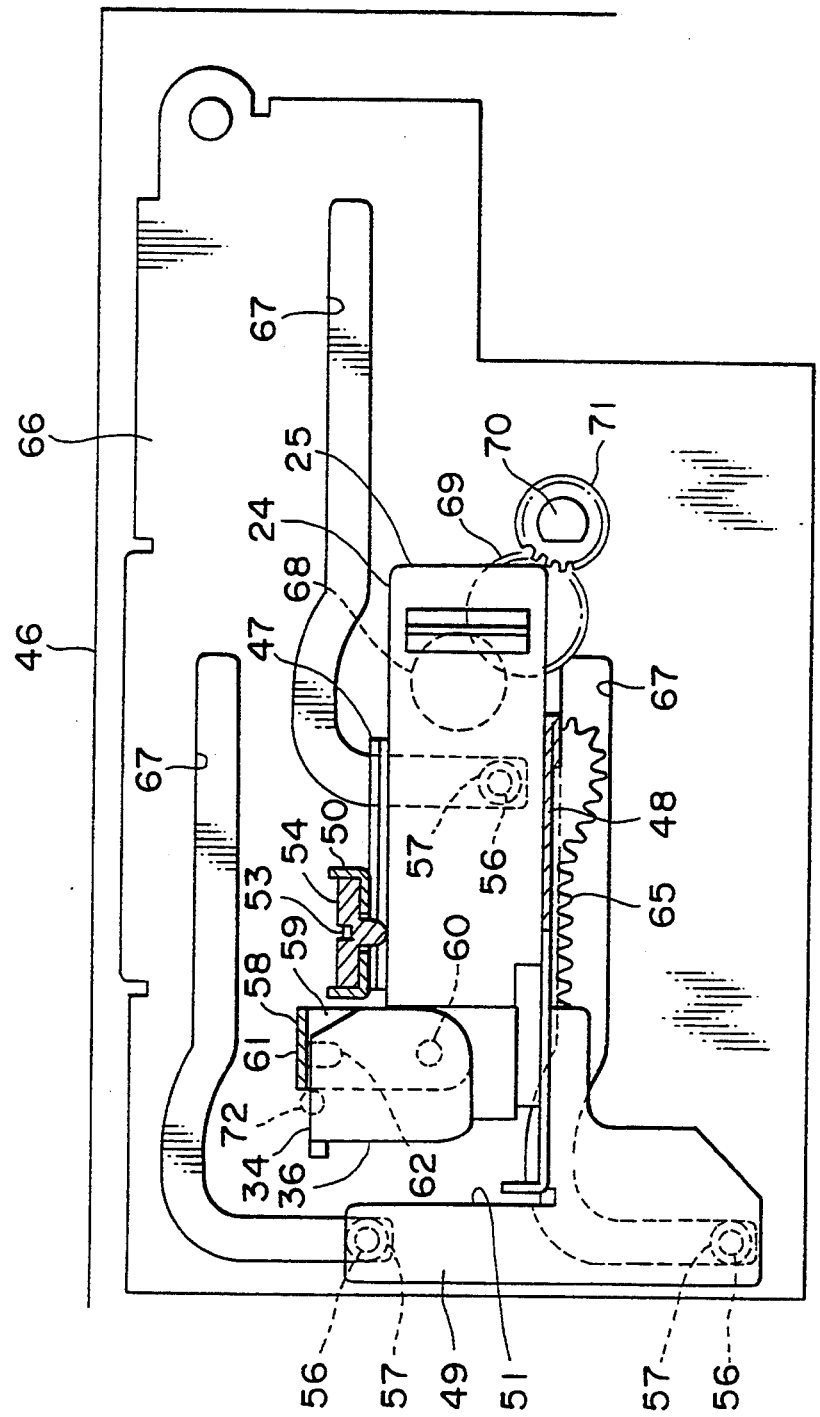
FIG. 18 is a side view of the cartridge compartment plate in a state in which the cartridge compartment plate is at the cartridge loading position.
Figure 19:
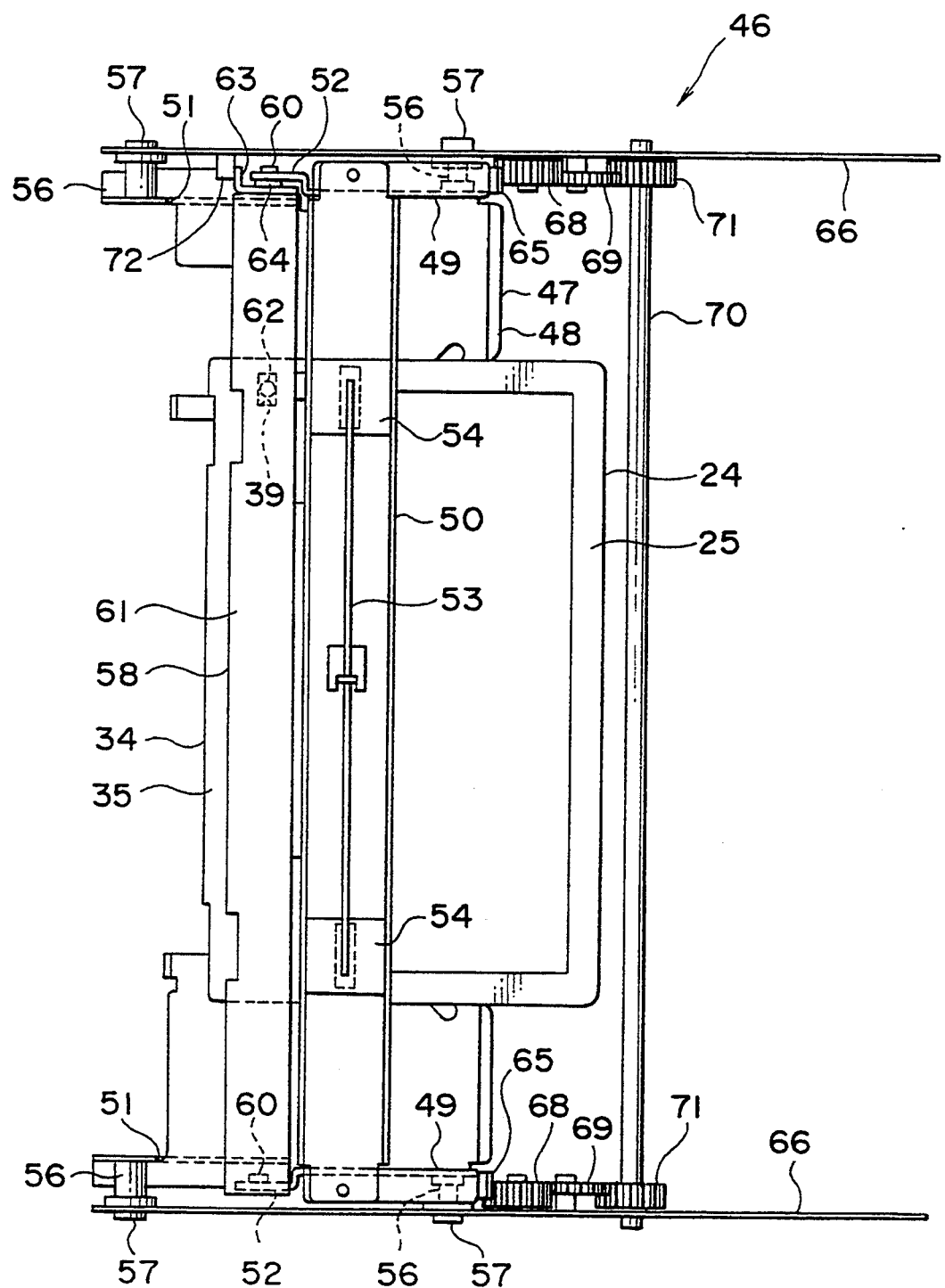
FIG. 19 is a plan view of the cartridge compartment plate of FIG. 17 in a state in which the cartridge compartment plate is at the cartridge loading position.
Figure 20:
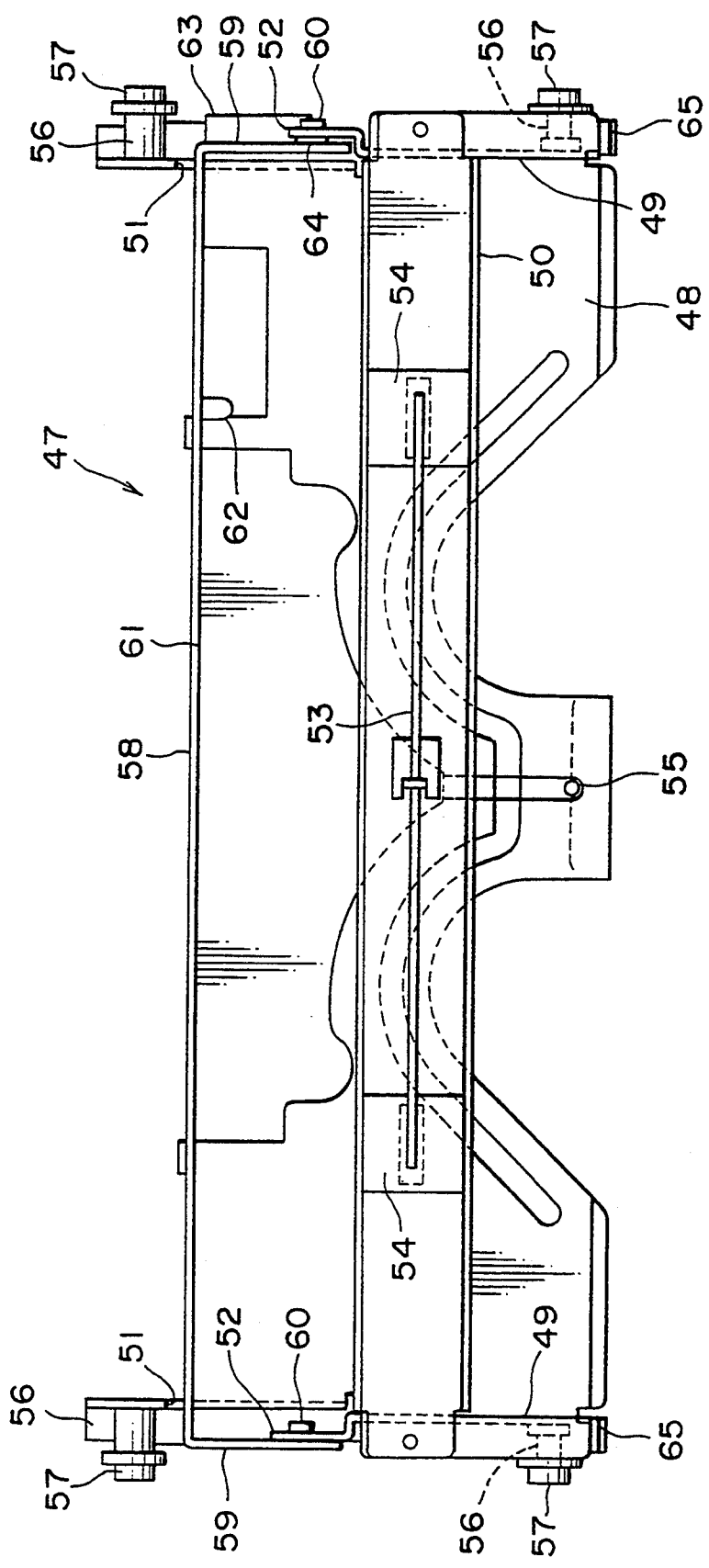
FIG. 20 is a plan view of the cartridge compartment plate of FIG. 17.
Figure 21:
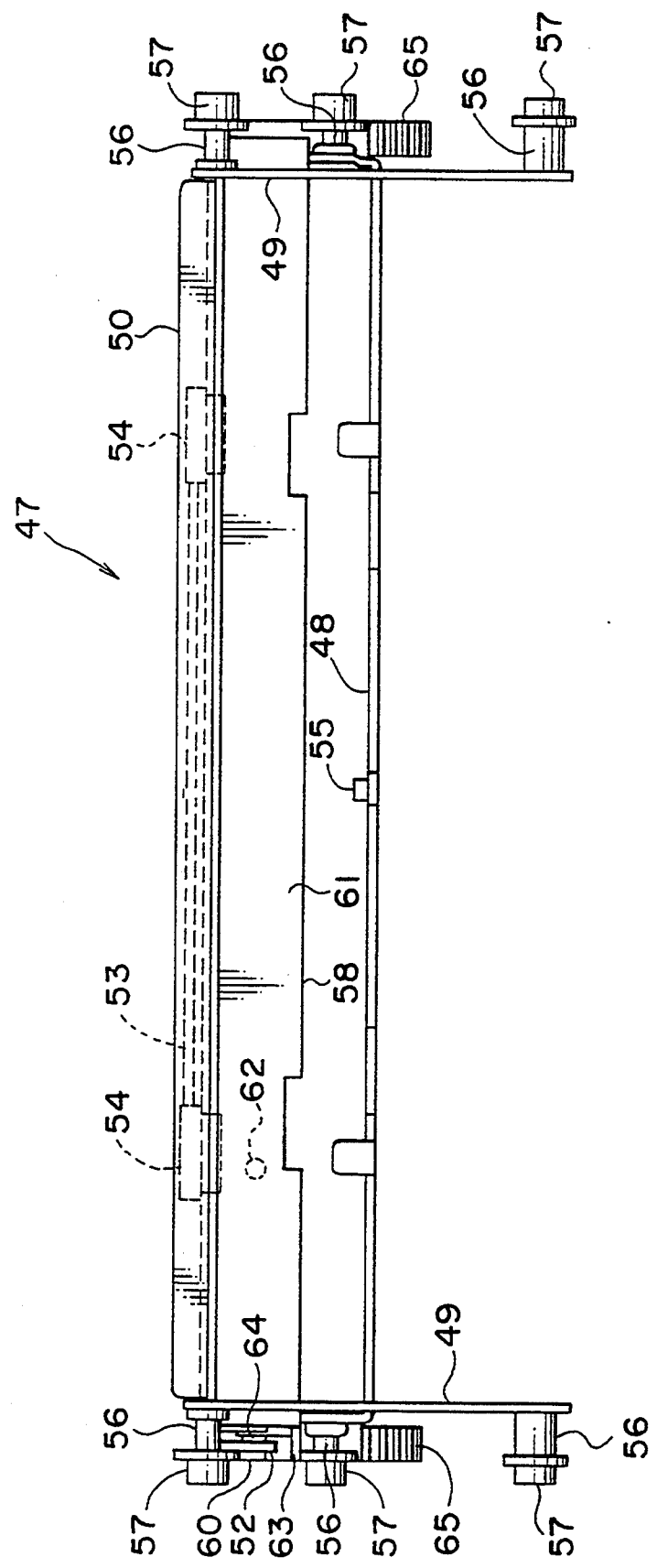
FIG. 21 is a front view of the cartridge compartment plate of FIG. 17.
Figure 22:
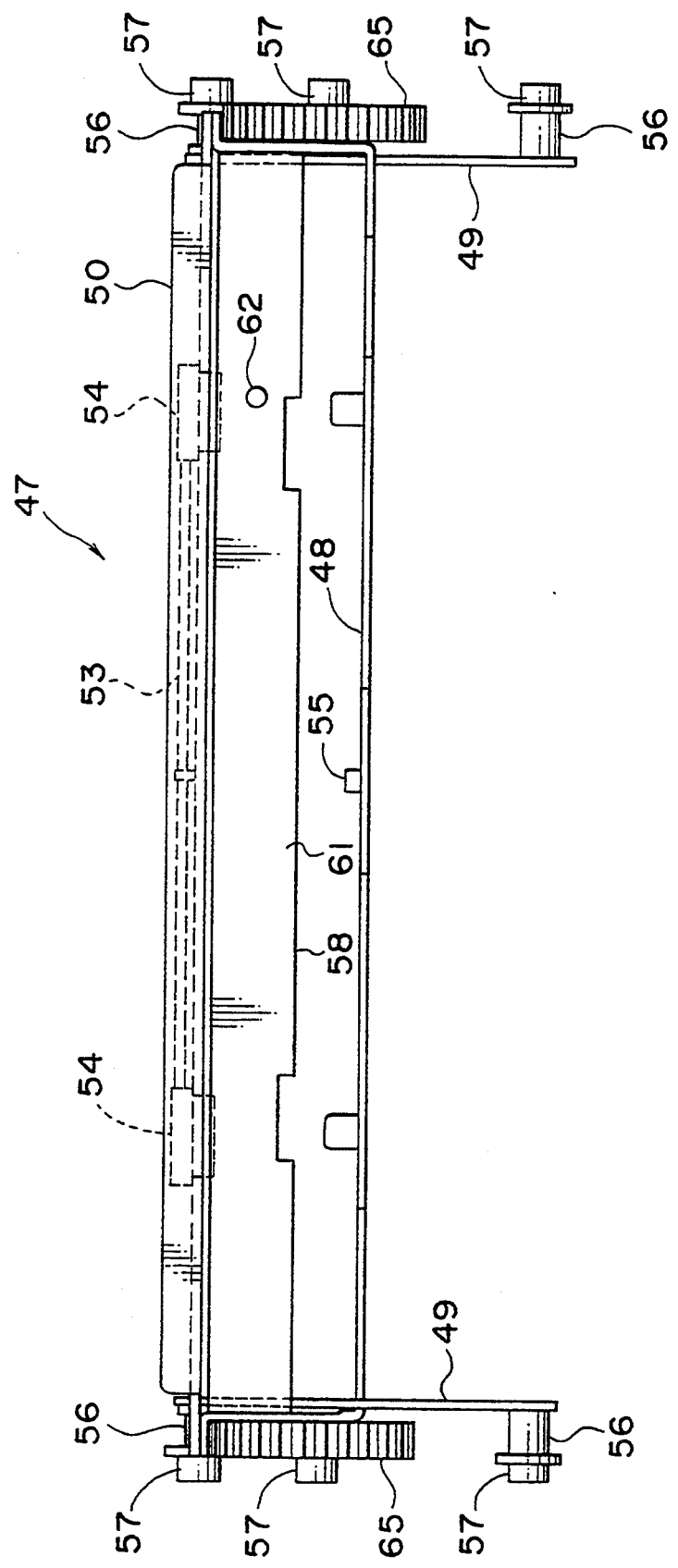
FIG. 22 is a back view of the cartridge compartment plate of FIG. 17.
Figure 23:
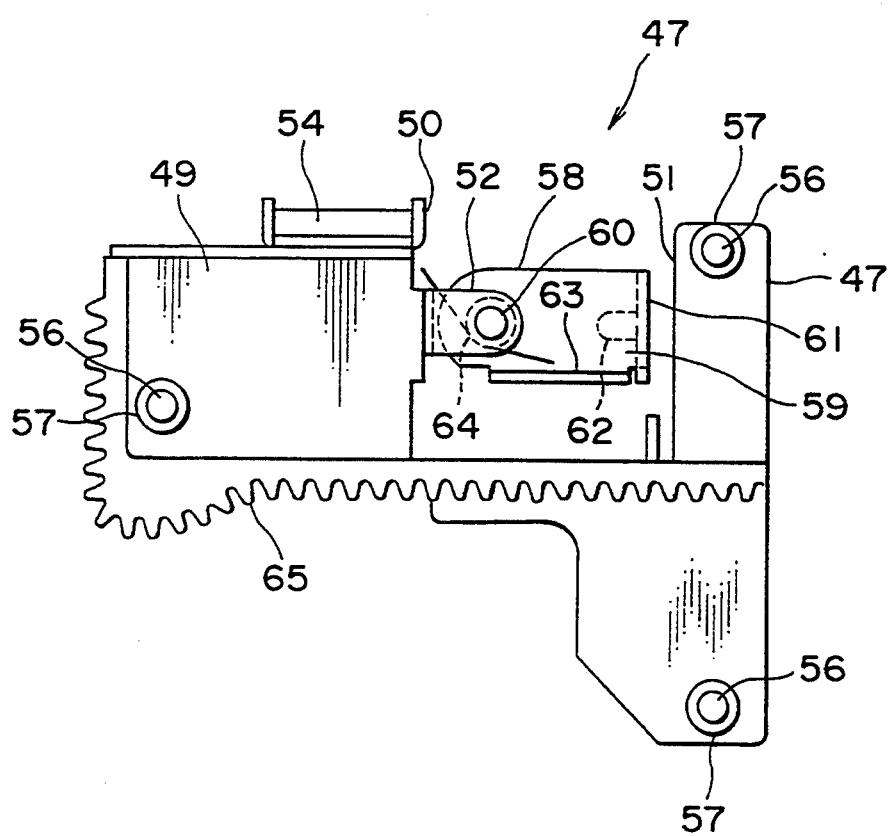
FIG. 23 is a side view of the cartridge compartment plate of FIG. 17.
Figure 26:
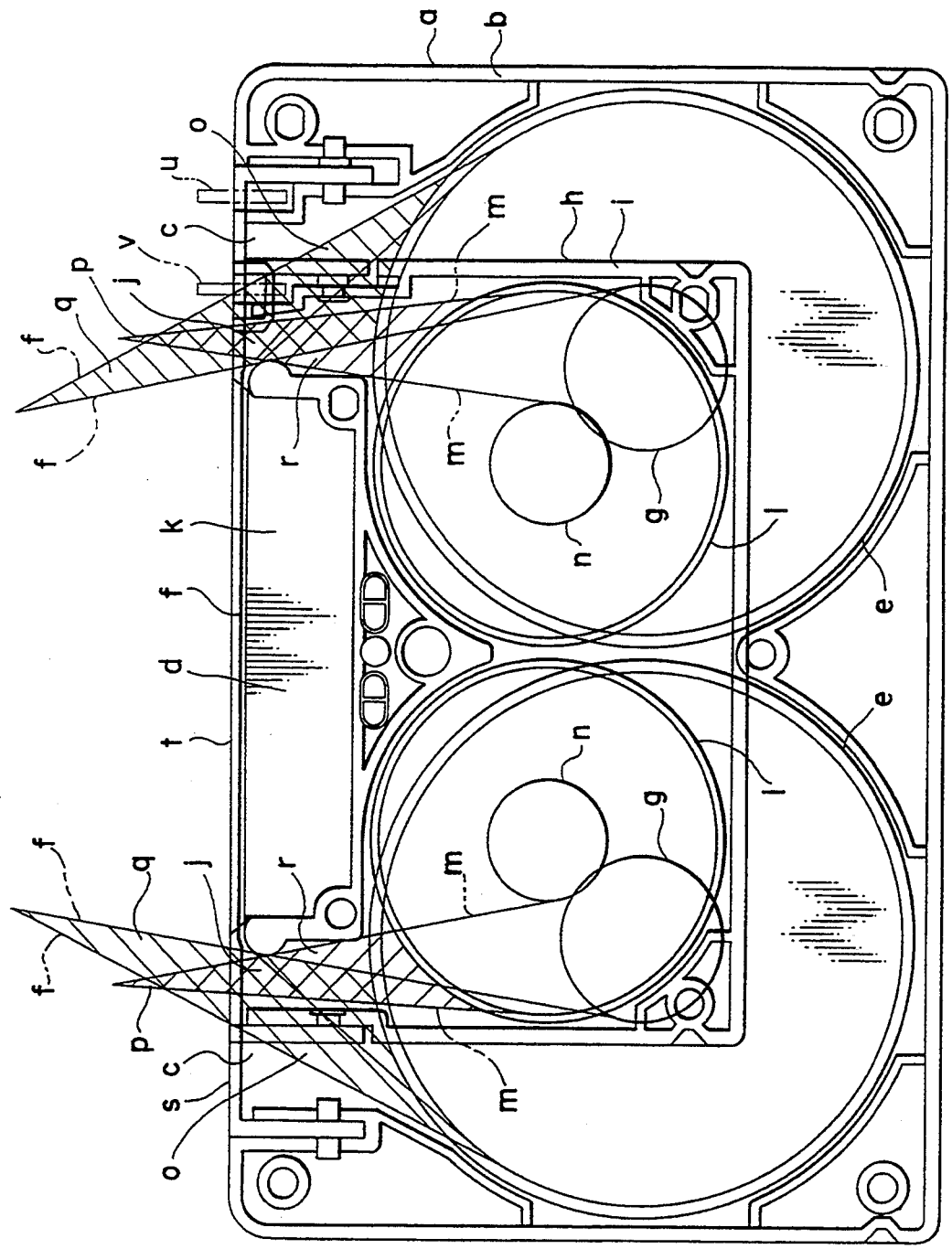
FIG. 26 is a schematic, horizontal sectional view of a large-sized tape cartridge and a small-sized tape cartridges hypothetically superposed in a recording/reproducing apparatus.

When removing the tape cartridge 1 (24) from the cartridge loading unit, the driving gears 68 are driven for synchronous rotation in the reverse direction, namely, in a clockwise direction, as viewed in FIGS. 15, 17 and 18. Consequently, the cartridge compartment plate 47 moves upward in the initial stage of return movement, and then moves horizontally backward. As the cartridge compartment plate 47 ascends, the lid opening pin 72 engaging with the lug 63 of the lid opening member 58 moves downward relative to the cartridge compartment plate 47 to allow the lid opening member 58 to be turned to its standby position by the torsion coil spring 64 and, consequently, the front lid 12 (34) of the tape cartridge 1 (24) are turned to its closed position.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A recording/reproducing apparatus provided with a tape cartridge holding device comprising:

cartridge holding means for holding a tape cartridge which includes a case provided with a mouth in its front portion, a recording tape medium held within the case with a portion thereof extending across the mouth, and a lid provided with a socket opening forwardly in its front surface, said lid being pivotally supported on the case at the front portion of the case so as to be turnable between a closed position where the lid covers the mouth and an open position where the lid opens the mouth;

a lid opening member including at least a first side portion pivotally supported on the cartridge holding means at a respective side of a tape cartridge held in the latter for turning about an axis of turning aligned with the axis of turning of the lid of the tape cartridge held in place on the cartridge holding means, and a laterally directed portion extending from the side portion of the lid opening member in front of said lid of a tape cartridge held in said cartridge holding means and provided with a projection capable of engaging in said socket of the lid from in front when the tape cartridge is held in place on the cartridge holding means; and lid actuating means for turning the lid opening member about its axis of turning between a first position corresponding to the closed position of the lid and a second position corresponding to the open position of the lid.

2. A recording/reproducing apparatus according to claim 1, wherein said lid actuating means comprises:

means for moving said cartridge holding means between a predetermined cartridge receiving position for receiving the tape cartridge into said cartridge holding means and a predetermined cartridge loading position for loading the tape cartridge; and a pushing member disposed in the path of said lid opening member so as to push said lid opening member as said cartridge holding means is moved from the cartridge receiving position toward the cartridge loading position with said projection engaged in said socket so that said lid opening member turns relative to said cartridge holding means in a direction for moving said lid to said open position thereof.

3. A recording/reproducing apparatus according to claim 2, wherein said means for moving moves said cartridge holding means substantially horizontally along a substantially horizontal first path in an initial stage of movement and substantially vertically downward along a substantially vertical second path in a final stage of movement when moving said cartridge holding means from the cartridge receiving position to the cartridge loading position, respectively.

4. A recording/reproducing apparatus according to claim 2, wherein said tape cartridge holding device further comprises means for biasing said lid opening member in a direction opposed to said direction of movement by said pushing member.

5. A recording/reproducing apparatus according to claim 1, wherein said lid opening member includes a second side portion pivotally supported on said cartridge holding means on the opposite side of said tape cartridge in respect to said first side portion and coupled to an adjacent end of said laterally directed portion for turning about an axis of turning aligned with the axis of turning of the lid of the tape cartridge held in place on said cartridge holding means.

6. A recording/reproducing apparatus provided with a tape cartridge holding device comprising:

a cartridge holding means for holding a tape cartridge comprising a case provided with a mouth in its front portion, a recording tape medium held within the case with a portion thereof extending across the mouth, and a lid provided with a socket opening forwardly in its front surface, said lid being pivotally supported on the case at the front portion of the case so as to be turnable between a closed position where the lid covers the mouth and an open position where the lid opens the mouth;

a lid opening member including at least a first side portion pivotally supported on the cartridge holding means at a respective side of a tape cartridge held in the latter for turning about an axis of turning aligned with the axis of turning of the lid of the tape cartridge held in place on the cartridge holding means between a first position and a second position, and a laterally directed portion extending from the side portion of the lid opening member in front of said lid of a tape cartridge held in said cartridge holding means and provided with a projection capable of engaging in said socket of the lid from in front when the tape cartridge is held in place on the cartridge holding means;

means for moving the cartridge holding means between a predetermined cartridge receiving position and a predetermined cartridge loading position;

a pushing member disposed in the path of the lid opening member so as to push the lid opening member as the cartridge holding means is moved from the cartridge receiving position toward the cartridge loading position with said projection engaged in said socket so that the lid opening member turns relative to the cartridge holding means from said first position to said second position to turn the lid from the closed position to the open position; and means for biasing the lid opening member in a direction from said second position toward said first position.

7. A recording/reproducing apparatus for use with first and second tape cartridges of different sizes and which is provided with a tape cartridge holding device comprising:

cartridge holding means for selectively holding said first and second tape cartridges in positions that are laterally centered in respect to a central plane of the cartridge holding means, each of the first and second tape cartridges having a case provided with a mouth in its front portion, a recording tape medium held within the case with a portion thereof extending across the mouth, and a lid provided with a socket equally positioned relative to said central plane for both said first and second tape cartridges and opening forwardly in its front surface, said lid being pivotally supported on the case at the front portion of the case so as to be turnable between a closed position where the lid covers the respective mouth and an open position where the lid opens the respective mouth;

a lid opening member including at least a first side portion pivotally supported on the cartridge holding means at a respective side of the selected one of said first and second tape cartridges held in the latter for turning about an axis of turning aligned with the axis of turning of the lid of the respective tape cartridge held in place on the cartridge holding means, and a laterally directed portion extending from the side portion in front of said lid of the selected one of the tape cartridges held in said cartridge holding means and provided with a projection capable of engaging in said socket of the lid from in front when either tape cartridge is held in place on the cartridge holding means; and lid actuating means for turning the lid opening member about its axis of turning between a first position corresponding to the closed position of the lid and a second position corresponding to the open position of the lid.

8. A recording/reproducing apparatus according to claim 7, wherein said socket of the larger of said first and second tape cartridges is spaced laterally a substantial distance from the nearest side of the respective case.

* * * * *